Aug. 16, 1966 M. I. DISMAN 3,267,322
FREQUENCY STABLE TEMPERATURE COMPENSATED ELECTRON TUBE
Filed Feb. 23, 1961
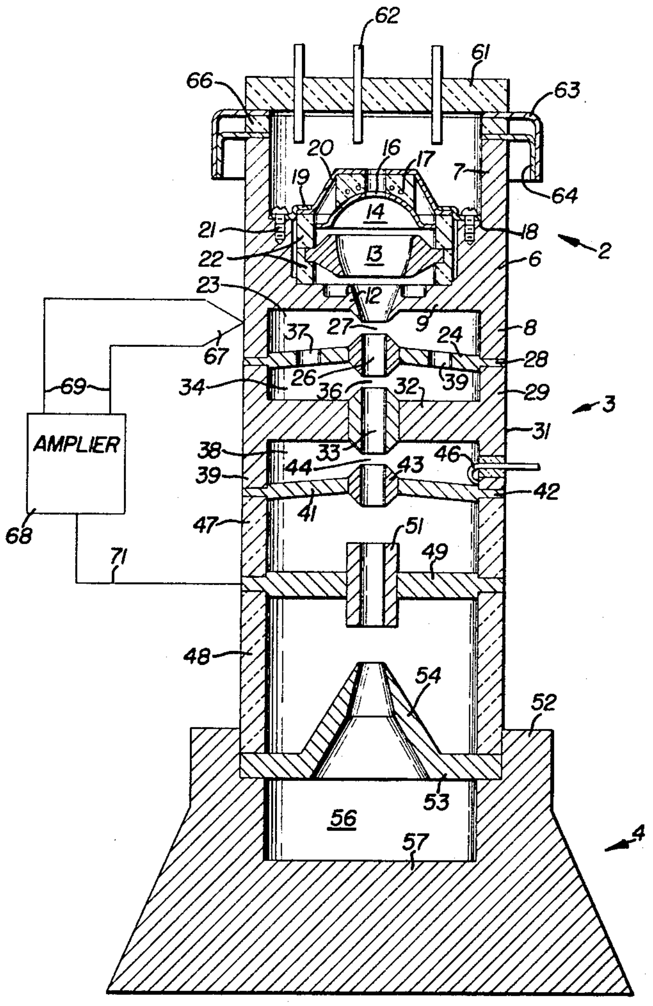
INVENTOR.
MURRAY I. DISMAN
BY
Robert W. Dilts
ATTORNEY United States Patent Office 3,267,322

Patented August 16, 1966

3,267,322

FREQUENCY STABLE TEMPERATURE COMPENSATED ELECTRON TUBE

Murray I. Disman, Sunnyvale, Calif., assignor, by mesne assignments, to Varian Associates, a corporation of California Filed Feb. 23, 1961, Ser. No. 91,181
9 Claims. (Cl. 315—5.24)

My invention relates to frequency-stable electron tubes, and more particularly to an ultra frequency-stable microwave power oscillator.

Recent administrative rulings by the Federal Communications Commission regarding the allocation of the frequency band between 2.2–2.3 kmc. for telemetry purposes has made it imperative that radio transmitters be developed capable of operating in this range. This requires a transmitter having frequency stability characteristics difficult to achieve. The required stability is one part in $10^5$ at 2.2 kmc. or a maximum frequency variation of ±22 kc. The only known satisfactory transmitting unit for the 2.2 kmc. band is designed around a crystal-controlled oscillator and oven, a frequency multiplier chain, and then a series of pencil triode amplifiers. The resulting transmitter is large and heavy, and the overall efficiency is not as high as required by the specific application for which it was designed.

It is therefore a broad object of the present invention to provide a light weight, extremely stable and efficient microwave power oscillator to operate in the 2.2–2.3 kmc. frequency band.

Since frequency instability in a microwave oscillator may result from mechanical vibration of its parts, it is another object of the invention to provide a microwave power oscillator which minimizes vibration as one of the causes of frequency drift.

In microwave devices, such as reflex klystrons having interaction gaps defined by grids, a prolific source of "noise" is the bombardment of the grid by the electron beam. Such "noise" may result in some frequency drift. It is accordingly a still further object of the invention to provide a microwave power oscillator which does not utilize grids.

Variations in the loading of the output circuit of an oscillator may also cause frequency drift or instability. Such variations, if not isolated from the frequency determining network of the oscillator, will cause undesirable frequency instability. It is therefore another object of the invention to provide a microwave power oscillator providing such isolation of the load from the frequency determining network.

The greatest single cause of frequency instability in microwave oscillators is probably fluctuation in ambient or operating temperature or both. The existence of this problem has been recognized in the reflex klystron art, where many attempts have been made to provide accurate temperature compensation, but none of these attempts have approached the degree of temperature stability required. The best frequency stability that can be expected from a temperature-compensated reflex klystron at 2.2 kmc. is a minimum drift of ±10 kc. per centigrade degree variation in ambient temperature. In the environments in which the oscillator embodying this invention is expected to see service the ambient temperature may range from −55° C. to over 100° C., and in a temperature-compensated reflex klystron, such a range could be expected to result in a frequency variation of ±1.5 mc., a figure obviously exceeding the minimum requirements of the oscillator of this invention. It is therefore an important object of the present invention to provide a microwave power oscillator having a frequency variation of less than ±22 kc. at 2.2 kmc.

One way in which a frequency stability of one part in $10^5$ could be achieved would be to enclose the oscillator of this invention in an oven and control the temperature of the oven. This would result in low efficiency, however, because power would have to be supplied to the oven. Accordingly, it is yet another object of the invention to provide a microwave power oscillator of the electron beam type which utilizes the power in the electron beam to supply the energy required to maintain the oscillator at substantially constant temperature.

Inasmuch as the oscillator of the present invention is intended for environments in which the ambient temperature may vary over a temperature range of about 150° C., the problem is presented of what to do with the excess beam power when the ambient temperature arises to its upper limits and less beam power is required to heat the oscillator. Under these conditions it is apparent that the tube operating temperature will have to be higher than maximum expected ambient, and that means must be provided for dissipating excess electron beam power to maintain the operating temperature of the oscillator substantially constant in order to attain a stability of one part in $10^5$, regardless of variations of the ambient temperature. It is therefore another and important object of the present invention to provide a microwave power oscillator incorporating means for utilizing the inherent kinetic energy of electrons to heat the oscillator when the operating temperature drops below the selected maximum operating temperature, and for dissipating such kinetic energy of the electrons when the operating temperature reaches selected value.

A still further object of the invention is to provide a frequency-stable microwave oscillator tube of the floating drift tube klystron type having a maximum outside dimension of approximately five inches and weighing only about one pound.

Another object of the invention is the provision of a floating drift tube klystron microwave oscillator capable of a minimum output of ten watts in the frequency range of 2.2–2.3 kmc. and having a frequency stability of .001% of the operating frequency at an efficiency of from 20% to 25%.

The invention possesses other objects and features of value, some of which, with the foregoing, are set forth in the accompanying description and the drawings. It is to be understood, however, that the invention is not limited to the embodiment of method or means described and illustrated but may be incorporated in other embodiments within the scope of the appended claims.

Briefly described, the ultra frequency-stable microwave oscillator embodying the invention comprises a multi-cavity floating drift tube klystron having a beam projecting electron gun section, a frequency determining radio-frequency interaction section, including an output cavity effectively isolated from the other cavities used, for extraction of energy from the beam, and a collector assembly section adapted to selectively intercept the beam projected through the tube. The three sections of the tube are integrally and hermetically united in axial alignment in a manner to provide a rigid evacuated envelope symmetrical about a longitudinal axis and incorporating electrical and thermal insulating envelope elements between the collector section and the radio-frequency interaction means. Mounted within the envelope in position to deflect and selectively intercept electrons from the beam are electrostatic tubular electrode means in the nature of an electrostatic lens. The insulating envelope elements co-operate to electrically and thermally insulate the lens from the collector, and to electrically insulate the lens from the body of the radio-frequency interaction structure while permitting thermal conduction therebetween. Means mounted on the body of the radio-frequency interaction structure monitors the temperature thereof and causes the electrostatic tubular electrode or lens to be positively charged when the monitored temperature drops below an optimum value. Such positive charging of the lens causes electrons to bombard the lens, effecting a rapid increase in the temperature thereof. Heat from the lens then flows through the electrically insulating but thermally conductive envelope element to the radio-frequency interaction structure to maintain the temperature thereof constant. Heat sink means associated with the collector aid in dissipating heat from the collector when the lens is biased to focus the beam on the collector. Such focusing of the beam on the collector results in removal of heat from the tube instead of applying it to the radio-frequency interaction structure.

Referring to the drawing:

The figure is a vertical half-sectional view illustrating the ultra frequency-stable microwave power oscillator of the invention.

In more specific detail, the ultra frequency-stable microwave power oscillator forming the subject matter of this invention comprises a multi-cavity floating drift tube klystron tube constructed in a cylindrical configuration symmetrical about a longitudinal axis for ease of fabrication and assembly. To further facilitate assembly and reduce costs, a major portion of the tube is adapted to be assembled into a loose complex of interrelated and self-jigging parts capable of being integrally and hermetically united into a composite while in a single brazing operation. Addition of the cathode-heater package and final sealing of the envelope completes the assembly and the envelope so formed is ready for evacuation.

To this end, the tube comprises an electron gun section 2, a radio-frequency interaction structure 3, and a collector assembly 4. The electron gun section is formed from a hollow cylindrical metallic envelope portion 6, having cylindrical oppositely extending flanges 7 and 8, and an intermediate transversely extending wall 9 rigidly supporting drift tube segment 12, which constitutes the accelerating electrode of the gun. The gun is completed by a focus electrode 13 operatively interposed between the accelerating electrode and cathode 14, the latter being apertured as at 16 to permit the passage of ions to prevent bombardment of the emitting surface of the cathode thereby, thus eliminating a source of instability in the oscillator. A heater coil 17 is operatively associated with the cathode. Cathode, heater and focus electrode form a unitized package rigidly but demountably secured in operative relation within the envelope on shoulder 18 thereof by a clamp bracket 19 including strap 20 and screws 21. Dielectric spacers 22 electrically insulate the cathode and focus electrode from each other and from the envelope.

The electron gun thus formed is adapted to project an electron beam along the axis of the tube through resonant cavity 23, defined by wall 9, cylindrical flange 8, and transverse wall 24 having drift tube segment 26 forming an integral part thereof in alignment with drift tube segment 12, the adjacent ends thereof defining interaction gap 27 therebetween. As illustrated, wall 24 is slightly bowed for rigidity, and a peripheral portion 28 of the wall is rabbeted on both sides thereof to form self-jigging seats for flange 8 on one side, and flange 29 on the other side. Brazing the wall to flange 8 results in an extremely rugged and vibration-free construction in which no appreciable variation of the gap width can occur due to vibration.

Flange 29 constitutes a cylindrical extension on hollow cylindrical metallic envelope portion 31, which includes transverse wall 32 having long drift tube 33 therein and which, with wall 24, defines a second or "buncher" cavity 34 in the radio-frequency interaction structure. Within cavity 34, adjacent ends of drift tube segments 26 and 33 define a second interaction gap 36. Coupling apertures 37 in common wall 24 provide feedback between cavities 34 and 23, while the length of drift tube 26 is proportioned to obtain oscillations. Cavities 23 and 34 determine the oscillating frequency of the tube and also perform the important function of modulating the electron beam.

On the opposite side of wall 32, and isolated from cavity 34 by wall 32 and long drift tube 33, is an integral output cavity 38, defined by wall 32 on one side, cylindrical flange 39 on envelope portion 31, and transverse wall 41 axially spaced from wall 32 and having a rabbeted peripheral portion 42 integrally and hermetically brazed to flange 39. Wall 41 is also slightly bowed to provide added rigidity against vibration. A short drift tube segment 43 on wall 41 in axial alignment with the other drift tube segments, cooperates with drift tube segment 33 to define an output interaction gap 44 therebetween. To couple electromagnetic energy out of the output cavity an appropriate coupling loop 46 extends into the output cavity from outside the envelope.

Hermetically interposed between collector assembly 4 and the radio-frequency interaction structure are a pair of axially aligned hollow dielectric members 47 and 48, illustrated as cylinders forming part of the envelope wall but not required to do so. Sandwiched between adjacent ends of the dielectric cylinders and supported thereby in transverse relation to the axis of the tube and axially spaced from drift tube 43 and wall 41, is a metallic wall 49 having a central aperture within which is supported a tubular metallic electrostatically energizable electrode 51 in the nature of an electrostatic lens, operatively connected in circuit as illustrated in the figure, and functioning as a variable heat source as will hereafter be explained.

As illustrated in the figure, one end of the dielectric cylinder 47 is hermetically brazed to the peripheral rabbeted portion 42 of wall 41 in alignment with flange 39. This cylinder is preferably formed from beryllium oxide, which possesses excellent electrical insulating properties while also having excellent heat conducting characteristics. Dielectric cylinder 48, on the other hand, is preferably formed from aluminum oxide which, while being an excellent electrical insulator, is also an excellent heat insulator. The end of dielectric cylinder 48 remote from wall 49 is integrally and hermetically brazed to collector flange 52 and radial flange 53 formed on hollow conical collector shell 54. As shown, shell 54 and recess 56 in collector body 57 cooperate to trap electrons which are projected thereinto.

In assembling the tube, the collector body 57 may be placed on a flat support and the remaining elements of the combination loosely stacked thereon in association with brazing rings of an appropriate material having a high melting point. The rabbeted peripheral portions of walls 49, 41, and 24 ensure proper axial alignment of the parts, usually without the need of jigs. It will thus be seen that the entire envelope structure, exclusive of the cathode-heater package and end cap or plate 61, may be assembled and brazed in a single operation. After the foregoing structure has been assembled and brazed, and after the cathode, heated and focus-electrode package is secured in place, the envelope thus formed is hermetically sealed at the end thereof remote from the collector. Such sealing means preferably includes a flat dielectric end cap or plate 61 having appropriate leads 62 extending hermetically therethrough for appropriate connection to electrodes within the envelope. Sealing rings 63 and 64, having their inner peripheries hermetically brazed, respectively, to an outer peripheral portion of plate 61 and flange 7, are heliarc welded at their outer peripheral edges to form a final hermetic seal for the tube. A ring 66 of dielectric material, sandwiched between the inner peripheral portions lends stability to the final seal. It will thus be apparent that the entire envelope may be assembled and brazed, and the final seal made without subjecting the cathode, heater and focus electrode to high brazing temperatures. Evacuation may then be effected in a conventional manner through an appropriate tubulation (not shown). Alternatively, where a cathode is used which is unaffected by high brazing temperatures, the entire envelope, including plate 61, may be finally brazed in an evacuated oven, thus eliminating the need for a tubulation.

Since variations in the temperature of cavities 23, 24 and 38 will correspondingly increase and decrease the size of the cavities and vary the widths of interaction gaps 27, 36 and 44, thus causing frequency drift or instability, it is necessary that the temperature of the radio-frequency structure be maintained substantially constant or between very close limits as heretofore indicated. To effect such close control, a thermal sensing device 67, such as a current-generating thermocouple, is provided mounted on the envelope in a manner to detect and be affected by slight changes in temperature of the envelope. In the figure the thermocouple is connected to the input of an amplifier 68 by leads 69, and the output of the amplifier is connected directly to the electrostatic lens by lead 71. Variations in temperature of the frequency determining structure are thus appropriately reflected as variations in the electric charge impressed on the electrostatic lens.

The cooperative relationship of the thermocouple, amplifier and lens is such that when the temperature sensed by the thermocouple equals a predetermined maximum operating temperature, the lens will be charged an appropriate amount and in an appropriate sign to focus the beam on the collector, which preferably is connected to a heat sink. Should the temperature drop below a predetermined minimum, the lens will be charged to cause impingement of the beam electrons on the lens. As the beam electrons impinge on the lens, this element will heat very rapidly and heat will flow through beryllium oxide cylinder 47 to the body of the interaction structure. Because of its unitary, integral construction, the heat from the lens will be rapidly distributed uniformly through the body until the predetermined maximum operating temperature is reached. At this point, the thermocouple will initiate a change in sign of the charge on the lens and the beam will once again be focused on the collector. By this method and means the temperature of the frequency determining network may be controlled between very close minimum and maximum limits.

It will, of course, be apparent that instead of the beam normally being directed into the collector and deflected to strike the lens only when the operating temperature drops below the desired value, the tube may be arranged to operate at the desired operating temperature with the beam normally impinging on the lens and adapted to be deflected into the collector when the normal operating temperature is exceeded.

While the foregoing description has been directed to a high frequency oscillator, it is not intended that the invention be limited to this particular application. For clarity of description we have chosen to describe the invention as used to maintain the constancy of the operating frequency of the tube by maintaining the temperature constant. It is fully realized that in another aspect the invention is useful to control or tune a resonant cavity through a selected range of frequencies by controlling the temperature of the frequency determining network.

I claim:

1. An electron tube comprising an envelope, an electron-emitter electrode within the envelope for emitting electrons, an end electrode within the envelope, interaction means within the envelope interposed between the electron-emitter and end electrode for interaction with the electrons, said interaction means comprising an output cavity, apertured metallic wall interposed between said output cavity and said end electrode and operable to intercept at least a portion of the electrons to control the temperature of said intraction means, a beryllium oxide wall section connecting said apertured wall means to said interaction means, and said apertured wall means being electrically insulated from said end electrode, the aperture in said wall means being arranged to place said emitter in sight of said end electrode.

2. A frequency stable beam type electron tube comprising an envelope having relatively thermally conductive and non-conductive electrically insulating portions, an electron gun for projecting a beam of electrons, an end electrode, radio-frequency interaction means interposed between said gun and said end electrode for interaction with the beam, said thermally conductive and non-conductive envelope portions being positioned between said interaction means and said end electrode with said thermally conductive portion being adjacent said interaction means and said thermally non-conductive portion being positioned adjacent said end electrode, means operatively interposed between the relatively thermally conductive and non-conductive envelope portions to maintain the temperature of the interaction means between predetermined limits correlated to the operating frequency thereof, temperature sensing means coupled to said interaction means for producing an electrical potential correlated to changes in temperature of said interaction means, and means for applying the electrical potential produced by said temperature sensing means to said means for maintaining the temperature of said interaction means between predetermined limits.

3. A frequency stable beam type electron tube comprising an envelope having relatively thermally conductive and non-conductive dielectric portions, an electron gun for projecting a beam of electrons, an end electrode forming a portion of the envelope and arranged to cooperate with the beam, radio-frequency interaction means for interaction with the beam, and means operatively interposed between the relatively thermally conductive and non-conductive envelope portions to control the temperature of the interaction means, said thermally conductive portion being interposed between said temperature controlling means and said interaction means.

4. A frequency stable beam type electron tube comprising an envelope having relatively thermally conductive and non-conductive dielectric portions, an electron gun for projecting a beam of electrons, an end electrode, radio-frequency interaction means forming a portion of the envelope and interposed between the electron gun and end electrode for interaction with the beam, said interaction means comprising an output cavity, metallic wall means forming a tubular passage aligned with the beam and interposed between the relatively thermally conductive and non-conductive envelope portions to control the temperature of the interaction means, said temperature controlling means being positioned between said output cavity and said end electrode, and said thermally conductive dielectric portion being positioned between said temperature controlling means and said interaction means.

5. A frequency stable beam type electron tube comprising an envelope including relatively thermally conductive and non-conductive dielectric portions, an electron gun within the envelope for projecting a beam of electrons, a collector electrode forming a portion of the envelope and arranged to normally intercept the beam, radio-frequency interaction means forming a portion of the envelope and interposed between the electron gun and collector for interaction with the beam, heat sensing means operatively associated with the envelope to sense the temperature of the interaction means, and variable heat source means operatively interposed between the relatively thermally conductive and non-conductive envelope portions and responsive to the heat sensing means to control the temperature of the interaction means, said thermally conductive and non-conductive portions being positioned between said interaction means and said collector with said thermally conductive portion being adjacent the interaction means, and said thermally non-conductive portion being adjacent the collector electrode.

6. A frequency stable beam type electron tube comprising an evacuated cylindrical envelope symmetrical about a longitudinal axis and including a body portion having an electrically conductive metallic section and relatively thermally conductive and non-conductive dielectric sections arranged end-to-end with the relatively thermally conductive dielectric section hermeticaly interposed between the electrically conductive metallic and relatively thermally non-conductive sections, at least one resonant cavity within the electrically conductive section, a drift tube extending into the cavity, an electron gun within the envelope arranged to project a beam of electrons through the drift tube and the cavity for interaction with the cavity, a collector electrode, and electrode means interposed between the relatively thermally conductive and non-conductive dielectric sections of the envelope and operably connected to the electrically conductive section of the envelope to deflect electrons from the beam onto said electrode means to heat the electrically conductive section of the envelope to a selected temperature.

7. The combination according to claim 6, in which said means interposed between the relatively thermally conductive and non-conductive sections and operable to deflect beam electrons includes an energizable electrode having an aperture therethrough aligned with the beam, and heat sensing means on the electrically conductive section to control the electrical potential of the energizable electrode.

8. An electron tube comprising an electron gun for projecting an electron beam, a collector electrode for collecting the beam, radio frequency interaction means for interaction with the beam, beam deflection means interposed between the interaction means and collector for controlling the temperature of said interaction section, a first dielectric member forming part of the tube envelope and connecting the deflecting means to the interaction means, and a second dielectric member forming part of the tube envelope and connecting the deflecting means to the collector, the first dielectric member having a higher coefficient of thermal conductivity than the second dielectric member.

9. Electron tube apparatus comprising an electron tube having an electron gun for projecting an electron beam, a collector electrode for collecting the beam, radio-frequency interaction means for interaction with the beam, beam deflection means interposed between the interaction means and collector, a first dielectric member connecting the deflecting means to the interaction means, a second dielectric member connecting the deflecting means to the collector, the first dielectric member having a higher coefficient of thermal conductivity than the second dielectric member, sensing means for detecting a change in a selected operating characteristic of said tube, and means responsive to the sensing means for varying the electrical potential of the deflecting means to control the number of electrons impinging on the deflecting means to maintain the selected operating characteristic substantially constant.

References Cited by the Examiner

UNITED STATES PATENTS

| | | | |
|---|---|---|---|
| 1,907,132 | 5/1933 | Thurston | 73—359 |
| 2,329,584 | 9/1943 | Bourne | 315—117 X |
| 2,468,145 | 4/1949 | Varian | 315—5.23 X |
| 2,587,303 | 8/1952 | Fernsler | 331—88 |
| 2,606,302 | 8/1952 | Learned | 315—5.33 X |
| 2,682,623 | 6/1954 | Woodyard et al. | 315—5.47 X |
| 2,692,945 | 10/1954 | Beaumont | 328—3 X |
| 2,777,969 | 1/1957 | Svensson | 315—5.34 X |
| 2,789,249 | 4/1957 | Janis | 315—518 |
| 2,903,614 | 9/1959 | Priest et al. | 315—5.52 |
| 3,003,080 | 10/1961 | Post | 315—117 |
| 3,061,754 | 10/1962 | Kajihara | 313—84 |
| 3,065,374 | 11/1962 | Rockwell | 315—5.32 |
| 3,089,976 | 5/1963 | Fentress et al. | 315—5.23 |
| 3,103,609 | 9/1963 | Zitelli | 315—5.23 X |

References Cited by the Applicant

FOREIGN PATENTS

| | | |
|---|---|---|
| 486,778 | 9/1952 | Canada. |

JAMES W. LAWRENCE, *Primary Examiner.*

RALPH G. NILSON, *Examiner.*

E. STRICKLAND, R. SEGAL, *Assistant Examiners.*